United States Patent [19]
Persson

[11] 3,891,427
[45] June 24, 1975

[54] METHOD FOR MELTING PREREDUCED ORE AND SCRAP

[75] Inventor: John A. Persson, Gibsonia, Pa.
[73] Assignee: Lectromelt Corporation, Pittsburgh, Pa.
[22] Filed: Oct. 12, 1972
[21] Appl. No.: 296,908

[52] U.S. Cl. .................................. 75/12; 75/11
[51] Int. Cl. .................................. C22d 7/04
[58] Field of Search ............... 75/10–13, 44 S, 75/3; 13/9, 20

[56] References Cited
UNITED STATES PATENTS

| | | | |
|---|---|---|---|
| 2,150,145 | 3/1939 | Avery | 75/11 |
| 2,769,706 | 11/1956 | Herneryd | 75/10 R |
| 2,805,929 | 9/1957 | Udy | 75/11 |
| 3,042,513 | 7/1962 | Crome | 75/13 |
| 3,555,164 | 1/1971 | Kostin | 75/10 R |
| 3,610,795 | 10/1971 | Antoine | 13/9 |
| 3,665,085 | 5/1972 | Dumont-Fillon | 13/9 |

*Primary Examiner*—C. Lovell
*Assistant Examiner*—Peter D. Rosenberg
*Attorney, Agent, or Firm*—Fred Wiviott; Ralph G. Hohenfeldt

[57] ABSTRACT

Highly prereduced iron ore is admitted through the top of a closed electric furnace so that the ore drops in the space between the electrodes and the furnace walls. The low iron content gangue floats to the top of the molten metal pool which forms at the bottom. The melt is maintained with heat produced by electric conduction through the highly resistive gangue or slag. The melt is delivered intermittently or continuously to an electric arc furnace in which scrap steel is added. The desired metallurgical qualities and final pouring temperature of the steel are obtained in the second furnace.

5 Claims, 2 Drawing Figures

INVENTOR
JOHN A. PERSSON

BY

ATTORNEYS

METHOD FOR MELTING PREREDUCED ORE AND SCRAP

BACKGROUND OF THE INVENTION

One of the established methods for making steel in an electric arc furnace involves depositing a charge of scrap metal in the furnace when the electrodes are withdrawn and the cover is removed. After the first scrap charge is introduced, the electrodes are inserted and the cover is replaced after which the charge is melted by the heat of the arcs between the electrodes and the irregular top surface of the scrap. When a molten pool has been produced and is at an appropriate temperature the furnace may again be shut down and opened so that additional charges of scrap metal and prereduced ore may be introduced. When the desired quantity of prereduced ore and scrap metal has been heated to a molten state the furnace begins its refining cycle during which additives are introduced for obtaining the proper metallurgical composition. Eventually the melt has the proper composition and temperature for pouring.

One of the disadvantages of the method just outlined is that the cold solid pieces of scrap metal short circuit the arc gaps between the electrodes and the charge. With modern control equipment, electrode position is controlled in response to electrode current and arc impedance which means that the electrodes are automatically withdrawn and repositioned whenever there is a short circuit caused by one or more protruding pieces of scrap. A concomitant of the continuous electrode adjustments that take place during the initial charging period is that electric power delivered to the furnace is extremely variable instead of being steady and maximized in which case the overall length of time for melting and refining the charge is extended. Of course, the total power consumed is also increased. It is therefore evident that it would be desirable to eliminate this iceberging, as the protrusion of scrap is called, and to have the arcs struck between the electrodes and a planar molten surface within the refining furnace.

Another undesirable characteristic of the above-outlined steel making process is the rapid deterioration of the refractory interior lining of the furnace that results from it being overheated by the great amounts of radiant heat that are generated in the relatively long arc which must be maintained between the electrode and irregular surface with protruding scrap metal. Moreover, long arcs tend to flare out and proximate and even impinge directly on the refractory lining, thus accelerating its deterioration. On the other hand, if the arcs are drawn between electrodes and a planar surface pool of metal, the arcs may be shorter and less instability and radiation will result.

Another disadvantage of the previously outlined conventional steel making process is that it requires using along with the scrap metal prereduced ore that is pelletized, briquetted or otherwise agglomerated. Experience has shown that if the prereduced ore is introduced as fine, granulated or spongy particles the ore tends to agglomerate or fuse in the furnace on top of the melt. Besides getting hung up in the furnace, this agglomeration has poor heat conducting characteristics, thereby causing the total melting and refining time to be extended.

The rate at which the furnace electrodes are consumed has an important bearing on the cost of making steel. In prior methods where short circuits caused by cold scrap metal interfere with proper arc formation, electrode consumption is inordinately high. This results in part from the arc being formed or concentrated on a limited area of the electrode that corresponds essentially with the exposed area of the protruding scrap. The increased current density and accompanying concentrated heat results in overheating and vaporization of the electrodes in the limited zones. As a result the electrodes are not only consumed faster but they are more vulnerable to cracking and fragmentation because of the unequal thermal stresses that are so produced.

SUMMARY OF THE INVENTION

A general object of the present invention is to not only overcome the foregoing disadvantages of prior steel making methods, but, in addition, to present a novel arrangement of apparatus and method of operating the same which facilitates substantially continuous production of steel.

A more specific object of this invention is to produce steel continuously using two furnaces in the first of which prereduced ore is melted by slag resistivity rather than an electric arc and then delivering the metal in a molten state to a second refining furnace in which scrap metal is added in a manner that does not interfere with formation of arcs having the proper characteristics.

Other objects of the invention are to provide a continuous steel making process which uses less electric power and consumes less electrode material than prior processes. Ancillary to these objects are the use of resistive heating to a large extent in order to avoid refractory lining deterioration that results from arc radiation in the furnace in which heating is obtained by arcing. Maintaining a flat melt in accordance with the new process contributes to achieving this object.

How the foregoing and other more specific objects are achieved will appear from time to time throughout the course of a more detailed description of a preferred embodiment of the invention which will be set forth hereinafter.

In general terms, the new method is characterized by melting prereduced ore, which is either pulverized or agglomerated and has high iron content, in a first electric furnace. The furnace preferably has in-line electrodes. The prereduced ore is fed in from the top of the furnace along the longitudinal sides of the row of electrodes. Initially, a slag layer must be built up. Acceptable methods of doing this are to either introduce starting slag or to arc melt the charge until sufficient slag is produced. A slag layer between 12 and 36 inches is sufficient to produce adequate resistance between the electrodes. The iron content of the prereduced ore charge is about 95% or greater and the remainder is largely gangue which contains little iron. The gangue floats to the top and contributes to slag formation. The electrodes project a short distance into the slag layer and not into the melt nor do they form an arc with the melt. Heat for melting is derived primarily by joule heating resulting from conduction between electrodes through the resistive slag. The prereduced ore charge absorbs heat from the slag layer which the ore drops through and from the molten metal layer underneath whereupon the heavy metal settles and the gangue rises to form additional slag in the top layer.

The first furnace may be tapped continuously or periodically and the molten metal derived therefrom is delivered for further refining to a second furnace which is preferably of the electric arc type. The molten metal is introduced into the arc furnace and forms a molten pool at the bottom thereof. The electric arcs keep the pool molten and hot enough so that scrap metal which may be charged into the furnace two or three times during the melting and refining operation will become molten largely by absorbing heat from the molten pool. The scrap metal is introduced between the electrodes and the interior furnace wall at a controlled rate so that there is very little probability that any of the metal will iceberg and short circuit any of the arcs.

A more detailed description of the new continuous steel making process and typical apparatus for practicing it will now be set forth in reference to the drawings.

DESCRIPTION OF A PREFERRED EMBODIMENT

Figure 1:
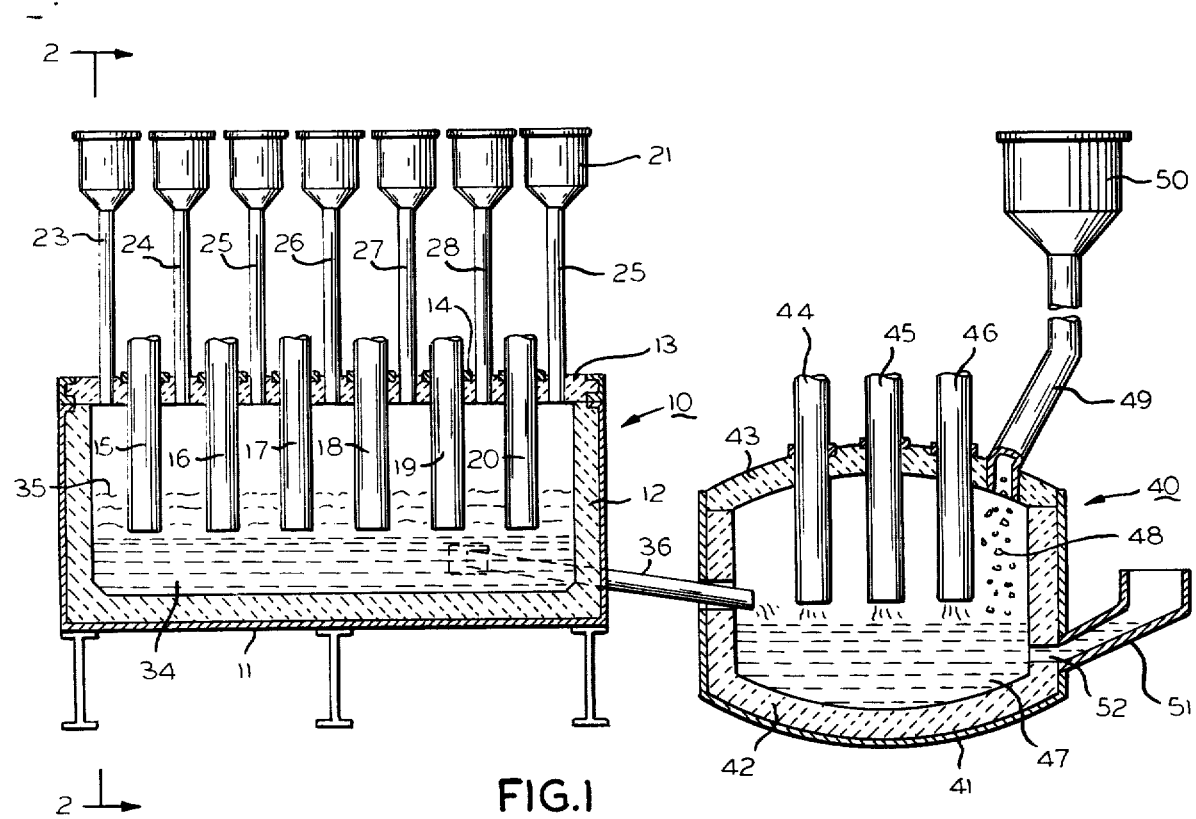
FIG. 1 is a schematic sectional view of a plant using one preferred form of the apparatus for carrying out the process of the present invention.

In FIG. 1, the prereduced ore melting furnace is generally designated by the reference numeral 10. This furnace has the usual bottom 11, side walls 12 and top 13 which are all made of refractory material. Projecting through suitable seals such as 14 in the top 13 of the furnace are a row of in-line electrodes 15–20. These electrodes may be self baked or prebaked carbon or graphite.

Figure 2:
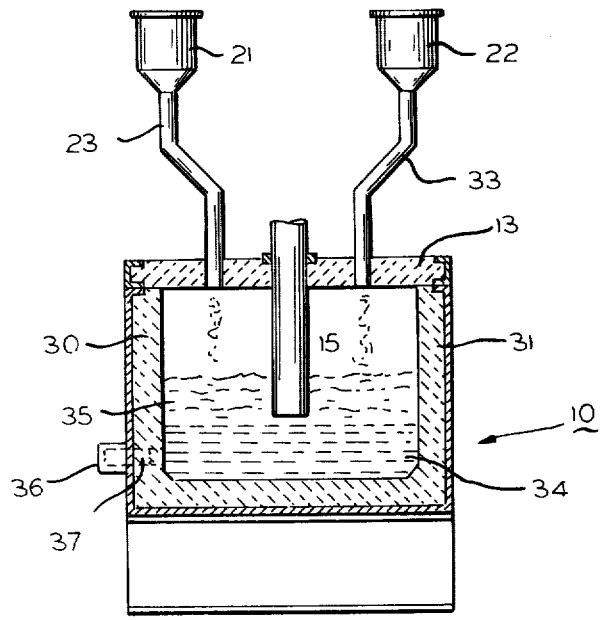
FIG. 2 is a schematic vertical section end view of the furnace shown at the left of the preceding figure and taken on the line 2—2 thereof.

Above the furnace are two lines of hoppers such as 21 and 22 in which prereduced ore is stored. A series of conduits 23–29 extend from hoppers 21 through furnace top 13 and are positioned for delivering prereduced ore into furnace 10 into the longitudinally extending space between the row of electrodes 15–20 and the furnace side walls which are marked 30 and 31 as can be seen in FIG. 2. A similar series of conduits such as 33 extend from hopper 22 into furnace 10 for delivering prereduced ore to the opposite longitudinally extending space between the electrode row 15–20 and side wall 31.

The electric power supply for the electrodes 15–20 is not shown but may be variously designed as will be understood by those skilled in the art. For instance, the power supply may include three single phase transformers with delta connected primaries and three open single phase secondaries. The terminals of each secondary may be connected to a pair of electrodes in which case electrodes 15 and 16 may be fed from one secondary, electrodes 17 and 18 from another and electrodes 19 and 20 from still another. Current is then conducted between adjacent pairs of electrodes such as 15 and 16 rather than between non-cooperating pairs such as 16 and 17, for example. The power factor of the system is advantageously high because effective interlacing of the secondary conductors, not shown, can be achieved almost to the electrodes, thus reducing inductance.

Since it is desirable to maintain the low oxygen content of prereduced ore in furnace 10, a sufficient quantity of slag is preferably formed initially prior to introducing the metal bearing charge. It will be understood that when the first charge of prereduced ore is introduced, melting may be initiated by arcing at first and this process may be carried out until a suitably thick slag layer 35 has formed on the top of melt 34.

In any event, the electrodes 15–20 are not operated in the arcing mode after the initial stages of the melting process. Instead, the electrodes are adjusted to an elevation where arcing between their tips and the molten pool 34 is precluded. Heat for keeping pool 34 molten is then obtained almost entirely from electric conduction between pairs of electrodes through the highly resistive, low iron content slag layer 35. The temperatures of the metal melt 34 and slag 35 are both high and cause a considerable increase in the temperature of the refractory furnace lining but the temperature reached by the refractory is not nearly as great as it would be if direct radiation from the arcs were occurring. Thus, this method of melting is particularly well adapted for use in a system which contemplates continuous production of steel with a minimum of interruptions for rebuilding the refractory lining.

As explained earlier and as exemplified in FIG. 2, prereduced ore is charged into furnace 13 along the sides of the row of electrodes 15–20. The ore descends through slag layer 35 in which the ore absorbs heat and melts quickly to separate into a heavy metal component which settles into molten pool 34 and into gangue or slag which joins the slab layer 35. The incoming ore thus reduces the temperature of the slag in the vicinity of the furnace wall and to that extent contributes toward minimizing deterioration of the refractory due to higher temperatures that would otherwise prevail. During the melting process, if there is no frothing from remanent gas producing chemical reactions, the electromagnetohydrodynamic forces produced by conduction through the slag causes the superheated charge to flow towards the electrodes away from the furnace walls and to circulate back again at a lower level towards the walls. On the other hand, if frothing occurs this may overcome the electromagnetohydrodynamic forces and produce a counterflow in the opposite sense. These phenomena maintain the temperature of the slag in the region where the ore drops through at a value that effectuates maximum heat transfer from the slag to the colder ore. It is easy to control the temperature of the melt in furnace 10 with a relatively unsophisticated low response rate conventional electrode position control in conjunction with secondary voltage adjustment since it is only necessary to slowly change the amount of electrode submergence in the slag layer in which case the impedance of the conductive slag path changes and heating current varies correspondingly.

The molten metal from furnace 10 may be periodically or continually delivered to a refining electric arc furnace which is generally designated by the reference numeral 40. This may be done by withdrawing molten metal from furnace 10 in a ladle and pouring it into refining furnace 40 as required. In the alternative, molten metal 34 may be delivered from furnace 10 to furnace 40 through a runner such as the one marked 36. Runner 36 is refractory lined and is subject to molten metal flow control by means of a removable plug which is conventional and is schematically represented and marked with the numeral 37. The runner is shown side mounted on furnace 11 but it would be on the end.

Electric arc furnace 40 further refines the mixture of molten metal from furnace 10 and scrap metal which is added to the refining furnace melt and melted therein. When the melt in furnace 40 has obtained the desired metallurgical composition and temperature, the furnace may be tapped for utilization of the metal by any suitable means which are not shown. The means for introducing additives and alloying agents are not shown in connection with furnace 40 since they are conventional.

Furnace 40 may comprise the usual metal shell 41 with a refractory lined interior 42 and a refractory lined top 43. Three electrodes 44–46 extend through top 43 and are energized and position controlled by conventional means which are not shown. These electrodes are operated in a mode in which a uniform and relatively short arc is maintained between the electrode tips and the molten metal bath 47 which exists in the bottom of furnace 40. The initial charge of molten metal is derived from melting furnace 10. When the temperature of the initial charge is high enough, scrap metal 48 may be dropped into melt 47 from a conduit 49 which extends through furnace top 43 and is supplied from an overhead scrap metal bin 50. Alternatively, scrap may be machine charged through a door in the furnace wall. The melt which is to be refined in furnace 40 may consist entirely of metal obtained from melting furnace 10 but it is contemplated that two or three charges of scrap metal will be introduced into furnace 40 during a melting and refining cycle. Note that the arrangement permits introduction of both scrap metal and molten metal to furnace 40 without opening the top of the furnace. This avoids shutting down the continuous operation for charging and it reduces atmospheric contamination and heat loss that would otherwise occur if the furnace were opened.

Since a large mass of molten metal 47 is consistently maintained at the bottom of furnace 40 any scrap metal charge 48 which is introduced will sink into the melt and dissolve rapidly because of the high thermal capacity of the melt. As a result, solid scrap does not protrude through the otherwise planar top surface of the melt 47 and there is little probability of an arc being short circuited by solid metal. As a result of the arcs being formed between the tips of electrodes 44–46 and melt 47, which is always flat on top, the electrode currents are maintained constant and balanced with minimum operation of the impedance responsive control mechanism which is usually used in conjunction with furnaces of this type. Because the arcs are formed between the lower face tips of the electrodes and the flat melt, there is little inclination for hot spots to develop on the electrodes which would accelerate their vaporization and consumption. Thus, it is contemplated that non-consumable electrodes may be used in arc furnace 40. This type of electrode may be made of copper and water cooled interiorly to minimize the possibility of thermal disintegration.

As explained earlier, molten metal may be delivered from melting furnace 10 to refining furnace 40 optionally by means such as runner 36 or by ladling melt from one furnace to another. If the molten metal is delivered with ladles, furnace 40 may be equipped with a refractory lined receiving spout 51 which has its exit opening 52 below the intended top surface of melt 47. Such an arrangement is self-sealing, prevents emission of gases from furnace 40 and permits introduction of molten metal without interrupting operation of furnace 40. Furnace 40 may be at any elevation compared with furnace 10 if metal is delivered with a ladle from first furnace 10 to second furnace 40.

It should be noted that the system permits obtaining optimum proportions of metal derived from molten prereduced ore and that the system permits establishing the desired proportionality between these two components with ease. Thus, the most economical percentage of from 30–50% of scrap metal may be obtianed if desired or, in order to maintain continuity or for other reasons, 100% of molten prereduced ore may be used in refining furnace 40.

In summary, a new process for continuous production of steel has been described. The process is characterized by melting prereduced ore in a first furnace by a slag resistivity heating method. A slow response low duty cycle electrode control system may be used with the first furnace becuse only minor infrequent electrode adjustments are required. Neither furnace need be opened for charging in which case heat losses and atmospheric contaminations are minimized. The molten metal produced in the first furnace is delivered to a second refining and alloying furnace in which scrap is added as desired. Electrode life in the second furnace is extended because arcs are formed between the electrode tips and a planar melt surface even though solid scrap is periodically introduced into the furnace. The system is especially well adapted for supplying finished molten metal to one or more continuous casting machines or other means which use molten metal as rapidly as it can be produced. The process features reduced heat losses, little atmospheric contamination, a shortened time interval for producing a ton of steel, and low electric power consumption per ton.

Although the process has been described as being carried out with particular apparatus such description is to be considered illustrative rather than limiting for the process and the arrangement of the apparatus may be variously embodied and is to be limited only by interpretation of the claims which follow.

I claim:

1. A continuous steel making process comprising the step of:

providing a first electric furnace having a plurality of electrodes, feeding into said first electric furnace a quantity of prereduced ore which comprises a major portion of elemental iron and minor portion of gangue that has a low concentration of iron compounds and that is meltable to produce electrically resistive slag, energizing said electrodes to melt said ore, forming a layer of molten metal at the bottom of said furnace and a layer of molten slag on the top of said metal layer, immersing the end portions of said electrodes in said slag layer and spaced from said molten metal layer, passing electric current from said electrodes through said electrically resistive slag layer to generate heat which is substantially confined to the highly resistive path provided by said slag, feeding additional prereduceed ore into said slag layer and melting the same whereby the metallic portion thereof passes through said slag into said molten metal layer and the gangue portion of said prereduced ore becomes a part of the slag, and conducting a quantity of said molten metal from said first furnace and beneath the slag layer thereof to a second electric furnace having a plurality of electrodes, and further refining said metal in said second electric furnace.

2. The method set forth in claim 1 including the step of:

a. adjusting the voltage applied to said electrodes and the depth to which said electrode portions extend into said slag layer so as to control the temperature of the melt by controlling the current density in the conductive path of the slag.

3. The method set forth in claim 2 and further including the steps of:

maintaining a molten metal layer with a flat upper surface in said second electric furnace, maintaining the electrodes in said second furnace in spaced relation from said flat upper surface of said molten metal layer, energizing the electrodes of said second electric furnace to produce an arc discharge between said electrodes and said molten metal layer, and charging said second furnace with scrap metal at a point displaced from the electrodes.

4. The method set forth in claim 3 wherein:

a. the total charge in said second furnace in the final stage of refining comprises at least 50% of molten metal obtained from said first furnace and the remainder obtained by melting scrap in said second furnace.

5. The method set forth in claim 4 and including the step of introducing the prereduced ore into said first electric furnace between the electrodes thereof and the adjacent wall of said furnace.

* * * * *